(12) United States Patent
Lim

(10) Patent No.: US 8,893,569 B2
(45) Date of Patent: Nov. 25, 2014

(54) POWER TRANSMITTING APPARATUS

(75) Inventor: Sun Ho Lim, Bucheon-si (KR)

(73) Assignee: Sejin-Igb Co., Ltd. (KR)

( * ) Notice: Subject to any disclaimer, the term of this patent is extended or adjusted under 35 U.S.C. 154(b) by 111 days.

(21) Appl. No.: 13/377,351

(22) PCT Filed: May 4, 2010

(86) PCT No.: PCT/KR2010/002827
§ 371 (c)(1),
(2), (4) Date: Dec. 9, 2011

(87) PCT Pub. No.: WO2010/143814
PCT Pub. Date: Dec. 16, 2010

(65) Prior Publication Data
US 2012/0090415 A1 Apr. 19, 2012

(30) Foreign Application Priority Data
Jun. 10, 2009 (KR) .................. 10-2009-0051657

(51) Int. Cl.
*F16H 19/04* (2006.01)
*F16H 57/04* (2010.01)
*F16H 55/10* (2006.01)
*F16H 55/26* (2006.01)

(52) U.S. Cl.
CPC .............. *F16H 55/10* (2013.01); *F16H 19/04* (2013.01); *F16H 55/26* (2013.01)
USPC .................... 74/89.11; 184/6.12

(58) Field of Classification Search
USPC ......... 74/422, 89.11, 89.12, 89.17, 89.18, 29, 74/462, 465
See application file for complete search history.

(56) References Cited

U.S. PATENT DOCUMENTS 2,502,160 A 3/1950 Lamb
4,669,328 A * 6/1987 Kishi et al. .................. 74/422

(Continued)

FOREIGN PATENT DOCUMENTS

CN 1079281 12/1993
DE 10328421 1/2005

(Continued)

OTHER PUBLICATIONS

European Search Report—European Application No. 10786297.1 issued on Feb. 6, 2013, citing DE202004021273, NL9200238 and DE10328421.

(Continued)

*Primary Examiner* — Troy Chambers
*Assistant Examiner* — Jude Agendia
(74) *Attorney, Agent, or Firm* — Cantor Colburn LLP

(57) ABSTRACT

Disclosed is a power-transmitting apparatus. A power-transmitting apparatus of the present invention comprises: a pin gear provided with a plurality of pins capable of rolling movement; and a spur gear provided with a plurality of teeth and en-gagingly coupled to the pin gear so as to be relatively movable, wherein the spur gear teeth are formed with a cycloid tooth shape, and a polygonal tooth root space is formed at a tooth root region of the spur gear. As compared to a trochoid tooth shape, the tooth shape of the spur gear engagingly coupled to the pin gear so as to be relatively movable according to the present invention has a greater tooth size so that it can be applied as a cycloid tooth shape capable of maintaining a sufficient tooth contact ratio, and can resolve a reduction in tooth thickness and the wedging of the pins from an undercut at the tooth root region.

14 Claims, 9 Drawing Sheets

(56) References Cited

U.S. PATENT DOCUMENTS

| | | | |
|---|---|---|---|
| 5,390,557 A * | 2/1995 | Tsukada | 74/89.17 |
| 5,470,286 A * | 11/1995 | Fan | 475/331 |
| 5,537,889 A * | 7/1996 | Shigeura et al. | 74/464 |
| 5,540,111 A * | 7/1996 | Barnett et al. | 74/30 |
| 5,582,070 A * | 12/1996 | Dominguez | 74/411 |
| 5,704,248 A * | 1/1998 | Knotts | 74/416 |
| 5,836,205 A * | 11/1998 | Meyer | 74/89.17 |
| 6,023,989 A * | 2/2000 | Imase et al. | 74/422 |
| 6,761,660 B2 * | 7/2004 | Lim | 475/179 |
| 7,377,731 B1 * | 5/2008 | Arvin | 409/12 |
| 7,472,640 B2 * | 1/2009 | Maffeis | 92/136 |
| 7,526,977 B2 * | 5/2009 | Masui | 74/462 |
| 7,794,355 B2 * | 9/2010 | Pusateri | 475/331 |
| 8,381,608 B2 * | 2/2013 | Okamoto | 74/462 |
| 2002/0084164 A1 * | 7/2002 | Burger | 192/48.91 |
| 2007/0093353 A1 * | 4/2007 | Dalenberg et al. | 475/339 |
| 2010/0000358 A1 * | 1/2010 | Paluncic et al. | 74/468 |
| 2010/0101352 A1 * | 4/2010 | Paluncic et al. | 74/467 |

FOREIGN PATENT DOCUMENTS

| | | |
|---|---|---|
| DE | 202005014699 | 12/2005 |
| DE | 202004021273 | 8/2007 |
| FR | 2867543 | 9/2005 |
| JP | 19628663 | 7/1962 |
| JP | 1985190845 | 12/1985 |
| JP | 06229427 | 8/1994 |
| JP | 10-184842 | 7/1998 |
| JP | 11013426 | 1/1999 |
| JP | 11-210986 | 8/1999 |
| JP | 2002340142 | 11/2002 |
| JP | 2005-076685 | 3/2005 |
| NL | 19920000238 | 2/1992 |

OTHER PUBLICATIONS

International Search Report—PCT/KR2010/002827 dated Jan. 5, 2011.

Yuan Ye, The study of gear yawps and gear profiling, Mechanical Research & Application, 2006.

* cited by examiner

US 8,893,569 B2

POWER TRANSMITTING APPARATUS

TECHNICAL FIELD

The present invention relates to a power transmitting apparatus, and more particularly, to a power transmitting apparatus in which a cycloid tooth shape having a tooth size higher than a trochoid tooth shape and capable of maintaining a sufficient tooth contact rate is applied to a tooth shape of a tooth gear engagingly coupled to a pin gear capable of relatively moving so that a pin stuck phenomenon and reduction of a tooth thickness due to the undercut of a tooth root portion may be solved.

BACKGROUND ART

A power transmitting apparatus is largely divided into a rack and pinion for converting a rotational motion to a linear motion or vice versa and a gear train for transmitting only a rotational motion while converting a rotational speed and a torque. Typically, a power transmitting system of a power transmitting apparatus mainly uses a tooth shape according to an involute curve principle. However, there is a rare case of using a tooth shape according to a cycloid curve principle and a pin gear.

FIGS. 1 and 2 illustrate the structure of a part of a rack and pinion using an involute tooth shape according to a related art.

When a pre-load is applied to a rack and pinion using an involute tooth shape as illustrated in FIG. 1, a tooth J4 of a pinion J3 is forcibly inserted between teeth J2 of a rack J1 and contacts the teeth J2 so that a large frictional force is generated and thus efficiency is remarkably deteriorated.

Thus, at a stage of design, as illustrated in FIG. 2, a backlash that is a gap between the tooth J2 and the tooth J4 is formed to avoid a phenomenon that the tooth J4 of the pinion J3 is forcibly inserted between the teeth J2 of the rack J1.

However, when the backlash is formed as illustrated in FIG. 2, transfer or a motion is not smoothly performed, that is, a motion is transferred intermittently from the tooth J2 to the tooth J4, so that noise or vibration is generated. Further, the gears may rattle during a reverse motion.

FIG. 3 illustrates the structure of a part of a rack and pinion using a cycloid curve. FIG. 4 illustrates an undercut of FIG. 3. FIG. 5 is a structural view of FIG. 4. FIG. 6 illustrates a state in which a pre-load is applied in FIG. 3.

As a solution to solve the problem of the above-described involute tooth shape, as illustrated in FIG. 3, a rack and pinion in which a pin J5 in a roller form is used as the tooth J4 of the pinion J3 (see FIG. 1) and the teeth J2 of the rack J1 have a tooth shape formed of a cycloid curve may be taken into consideration.

According to the track and pinion of FIG. 3, since the pin J5 revolves, that is, the pin J5 performs a rolling motion, and moves on a tooth surface of the rack J1 to transfer a motion, transfer resistance is low. Further, several of the pins J5 are simultaneously engaged with several of the teeth J2 so that the motion may be continuously transferred and the rattling during reverse transfer may be prevented.

However, in the tooth J2 of the rack J1 according to the cycloid curve, when the pin J5 arrives at a tooth root J6, a radius of curvature of a central track of the pin J5 becomes zero so that, during the processing of the part of the rack J1, an undercut A such as a hatched portion in FIG. 4 may be problematic.

The undercut A may not be problematic when used for an apparatus that does not require precision. However, as illustrated in FIG. 5, it may be problematic when the undercut A is applied to an apparatus requiring high precision such as a precision mechanism because the pin J5 escapes from the tooth J2 of the rack J1 and does not follow a predetermined cycloidal track, thus failing to transfer a torque.

Further, as the escape and engagement of the pin J5 with respect to the tooth J2 of the rack J1 due to the undercut A, noise and vibration are generated so that life span of a tooth surface may be deteriorated.

In addition, as described above, in the tooth J2 of the rack J1 according to the cycloid curve in FIG. 3, when the pin J5 arrives at the tooth root J6, the radius of curvature of a central track of the pin J5 becomes zero and thus the diameter of the pin J5 matches the diameter of the tooth root J6. Accordingly, when the pin J5 arrives at the tooth root J6, about half of the outer circumference of the pin J5 closely contacts the tooth root J6 so that the pin J5 may be not rotated.

Thus, the pin J5 repeats rotation and stop at a portion around the tooth root J6 and also the pin J5 bumps against the tooth root J6 so that noise and vibration are generated. In particular, when a pre-load is applied between the rack J1 and the pinion J3 after removing backlash to improve rigidity, the above-described problem is severely generated.

As a result, in the tooth J2 of the rack J1 according to the cycloid curve, as described above, since the undercut A is generated, when the number of the pin J5 is small, a plurality of teeth J2 may not be always engaged. Also, in this area, a backlash in forward and reverse directions is inevitably generated, which has been disregarded until now.

Alternatively, a method of applying a pre-load between the rack J1 and the pinion J3 in order to remove a backlash that is a gap between the tooth J2 and the pin J5 may be taken into consideration. According to this method of applying a pre-load, since a force is applied to surfaces of the pin J5 and the tooth J2, no gap exists and initial twist of a part may be prevented so that rigidity may be greatly improved.

The tooth shape according to the cycloid curve is obtained by adding the radius of the pin J5 to a track (cycloid curve) drawn by the center of the pin J5 when the pinion J3 rolls. Thus, based on this fact, the tooth shape according to the cycloid curve has been reported as one being theoretically capable of smoothly transferring power by rolling contact.

Yet, when a pre-load is applied between the rack J1 and the pinion J3, as illustrated in FIG. 6, bump and release are made as much as the pre-load during engagement start and escape of the tooth J2 of the rack J1 and the pin J5 so that noise or vibration due to the bump and release may be generated. In particular, the bump and release causes fatigue of the pin J5 or the tooth J2 so that life span of the rack and pinion may be deteriorated.

In the above structure of the rack and pinion, to avoid the undercut of the tooth root portion and the pin and tooth forcibly insertion phenomenon that are generated when a pre-load is applied to the pin gear and the tooth gear corresponding thereto and the tooth shape of a cycloid curve of FIG. 3 is applied to the tooth shape of the tooth gear, a method of changing the tooth shape to a trochoid tooth shape may be suggested.

However, the trochoid tooth shape may have problems that reduction of a tooth size (tooth width and tooth height), reduction of a tooth shape contact rate due to reduction of a power transfer area of one tooth, remarkable deterioration of rigidity due to reduction of thickness in a tooth root portion, and shortening of life span of a pin support bearing due to an increase in a normal force applied to each pin gear during the application of the same torque due to a decrease of a pitch diameter of a pin gear by electrostatic potential.

Therefore, there is a demand for a method to solve a pin stuck phenomenon and reduction of a tooth thickness due to the undercut of a tooth root portion while a cycloid tooth shape having a tooth size higher than a trochoid tooth shape and capable of maintaining a sufficient tooth contact rate is applied to a tooth shape of a tooth gear engagingly coupled to a pin gear capable of relatively moving.

DISCLOSURE OF INVENTION

Technical Problem

The present invention provides a power transmitting apparatus in which a cycloid tooth shape having a tooth size higher than a trochoid tooth shape and capable of maintaining a sufficient tooth contact rate is applied to a tooth shape of a tooth gear engagingly coupled to a pin gear capable of relatively moving so that a pin stuck phenomenon and reduction of a tooth thickness due to the undercut of a tooth root portion may be solved.

Advatageous Effects

According to the present inventive concept, provides a power transmitting apparatus in which a cycloid tooth shape having a tooth size higher than a trochoid tooth shape and capable of maintaining a sufficient tooth contact rate is applied to a tooth shape of a tooth gear engagingly coupled to a pin gear capable of relatively moving so that a pin stuck phenomenon and reduction of a tooth thickness due to the undercut of a tooth root portion may be solved.

BEST MODE FOR CARRYING OUT THE INVENTION

Figure 1:
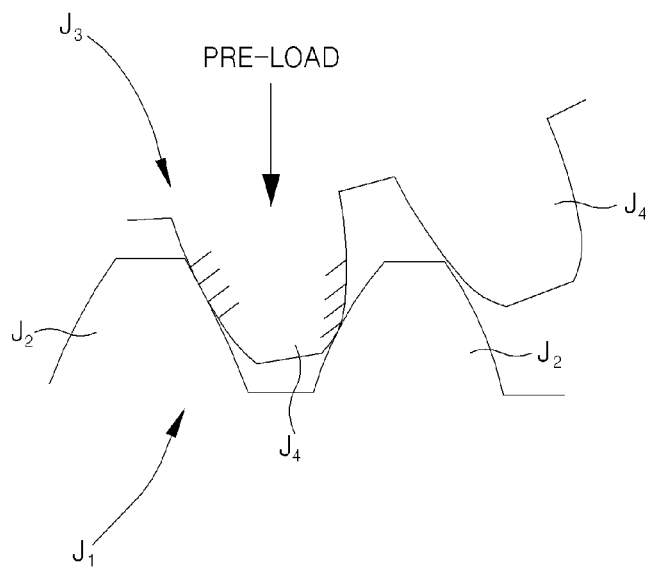
FIGS. 1 and 2 illustrate the structure of a part of a rack and pinion using an involute tooth shape according to a related art.
Figure 2:
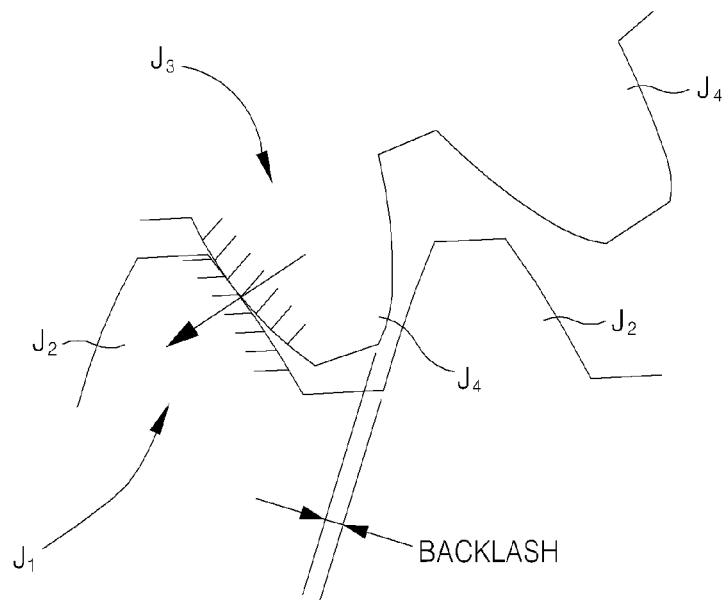

According to an aspect of the present invention, a power transmitting apparatus includes a pin gear provided with a plurality of pins capable of performing a rolling motion, and a tooth gear provided with a plurality of teeth and engagingly coupled to the pin gear so as to be relatively movable, wherein a tooth shape of a tooth of the tooth gear is formed in a cycloid tooth shape and a tooth root space portion having a polygonal shape is formed in a tooth root portion of the tooth shape.

The tooth root space portion may have a rectangular shape with edges that are round-processed.

In the tooth root space portion, an escape space according to a circumferential direction of each of the pins may be allowed and each of the pins and the tooth root may be restricted by each other in a radial direction.

The power transmitting apparatus may further include a lubricant supplying unit that is provided on the pin gear to supply a lubricant to the plurality of pins.

The pin gear may be a pinion-type driving gear and the tooth gear may be a rack-type driven gear.

The pin gear may include first and second circular plates arranged separated from and parallel to each other, with the plurality of pins provided therebetween at the same interval in a circumferential direction, first and second circular caps respectively coupled to exposed surfaces of the first and second circular plates, and a plurality of coupling members coupling the first and second circular caps and the first and second circular plates.

The pin gear may further include a plurality of pin support bearings coupled to the first and second circular plates and supporting both end portions of each of the plurality of pins so as to be capable of performing a rolling motion.

The lubricant supplying unit may include a lubricant storage provided in each of the plurality of pins and storing a lubricant, a lubricant ejection hole formed in a lateral surface of each of the plurality of pins to communicate with the lubricant storage and ejecting the lubricant in the lubricant storage to the outside of each of the plurality of pins, and a lubricant supplying portion provided in any one of the first and second circular caps and supplying the lubricant to the lubricant storage of each of the plurality of pins.

The lubricant supplying portion may be formed in a concave form in an inner surface of the any one circular cap and may have a radial structure in which a cross section thereof is gradually decreased toward the outside in a radial direction.

The lubricant ejection hole may be provided at two positions symmetrically in one of the plurality of pins in a lengthwise direction.

The lubricant supplying unit may further include a plurality of balls having a size relatively larger than the lubricant ejection hole and arranged at both end portions of each of the plurality of pins to reduce a frictional area of the pin.

The tooth gear may have a curved shape and the pin gear is partially inscribed or circumscribed on the tooth gear.

The pin gear may be a rack-type driven gear and the tooth gear may be a pinion-type driving gear.

The pin gear may include a gear main body to which the plurality of pins are linearly coupled at an equal interval, and a bushing coupled to the outside of each of the plurality of pins.

The lubricant supplying unit may include a lubricant storage provided in the plurality of pins and storing a lubricant, and at least one lubricant ejection hole formed in an outer surface of each of the plurality of pins to communicate with the lubricant storage and ejecting the lubricant in the lubricant storage to the outside between the plurality of pins and the bushing.

The lubricant supplying unit may further include a lubricant groove radially and inwardly formed in an area where the lubricant ejection hole is formed along a circumferential direction of each of the plurality of pins.

The lubricant supplying unit may further include a cap detachably coupled to an opening portion at one side of the lubricant storage.

MODE FOR INVENTION

Reference will now be made in detail to embodiments, examples of which are illustrated in the accompanying drawings, wherein like reference numerals refer to the like elements throughout.

Figure 7:
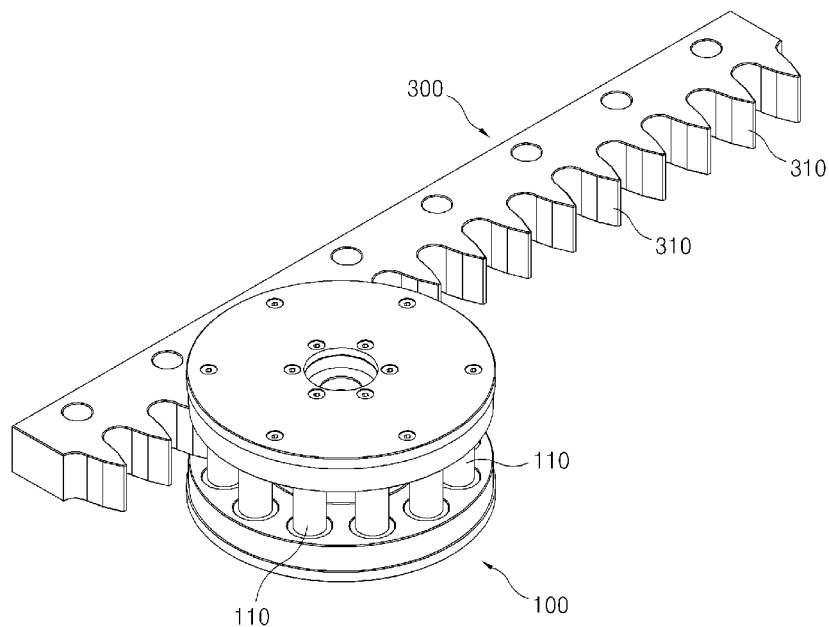
FIG. 7 is a perspective view of a power transmitting apparatus according a first embodiment of the present invention.
Figure 8:
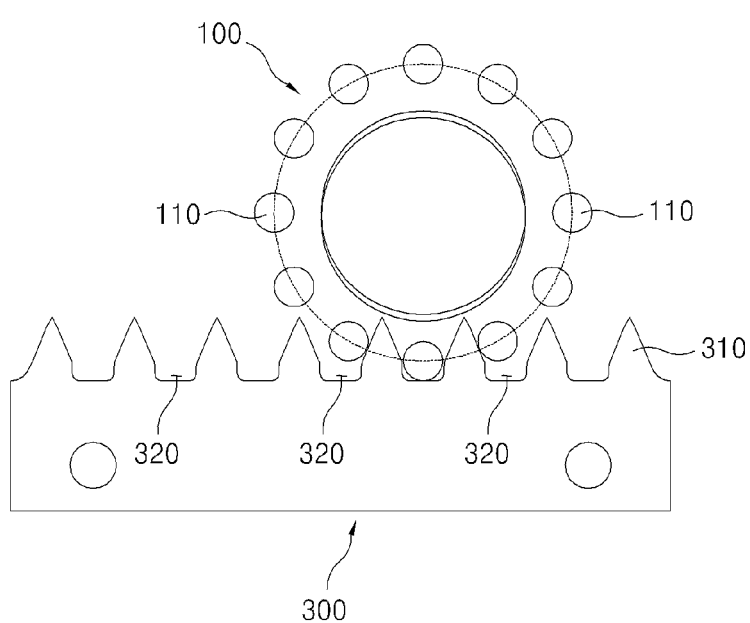
FIG. 8 is a side view of FIG. 7.
Figure 9:
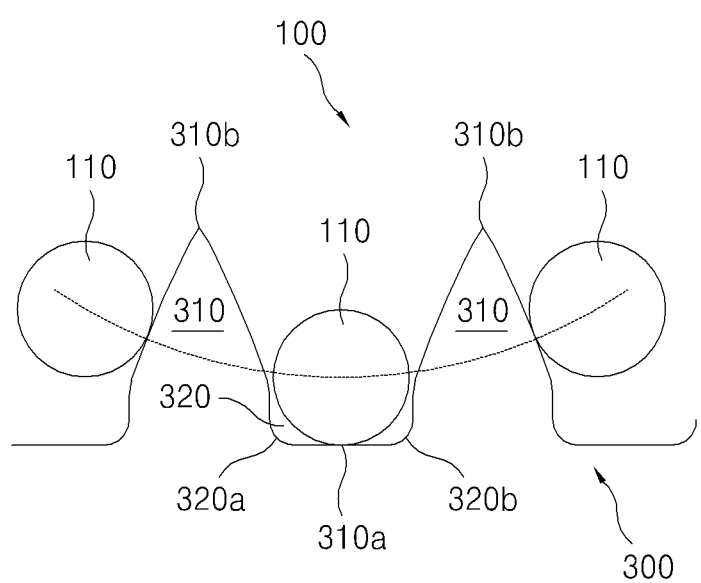
FIG. 9 is an enlarged view of a major part of FIG. 8.
Figure 10:
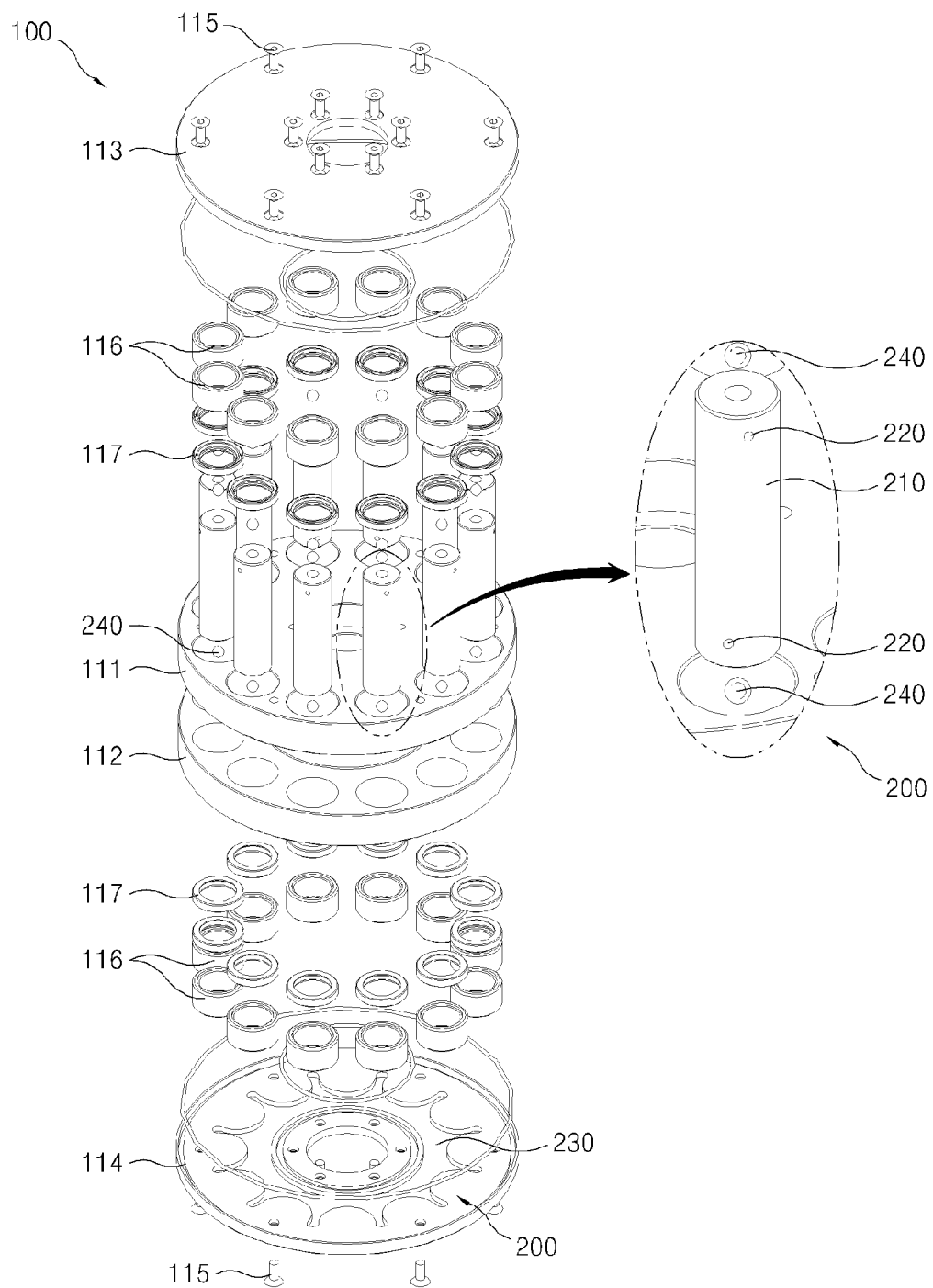
FIG. 10 is an exploded perspective view of the pin gear of FIG. 7.

FIG. 7 is a perspective view of a power transmitting apparatus according a first embodiment of the present invention. FIG. 8 is a side view of FIG. 7. FIG. 9 is an enlarged view of a major part of FIG. 8. FIG. 10 is an exploded perspective view of the pin gear of FIG. 7.

Referring to FIGS. 7-10, a power transmitting apparatus according to the present embodiment includes a pin gear 100 having a plurality of pins 110 capable of performing a rolling motion and a tooth gear 300 having a plurality of teeth 310 and engagingly coupled to the pin gear 100 to be capable of relatively moving.

In the present embodiment, the pin gear 100 is a pinion-type driving gear and the tooth gear 300 is a rack-type driven gear. That is, as the pin gear 100 to which a motor (not shown) is connected performs a rotational motion, the tooth gear 300 engaged with the pin gear 100 performs a linear motion, thereby forming a power transmitting system. However, the right scope of the present invention is not limited thereto and a reverse case may be available.

Figure 3:
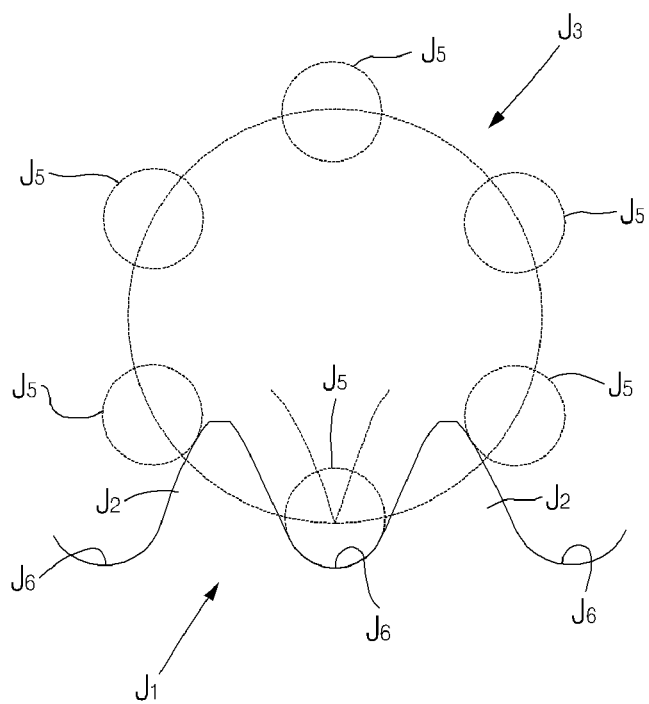
FIG. 3 illustrates the structure of a part of a rack and pinion using a cycloid curve.

In the power transmitting apparatus of a rack and pinion structure, as illustrated in FIGS. 8 and 9, the tooth shape of each of the teeth 310 of the tooth gear 300 is a cycloid shape as illustrated in FIG. 3, and a tooth root space portion 320 of a polygonal shape is formed in an area of a tooth root 310a of a tooth shape of each of the teeth 310.

In this embodiment, the tooth root space portion 320 has a rectangular shape with edges 320a and 320b that are round-processed. The tooth root space portion 320 is provided allowing an escape space according to a circumferential direction of each of the pins 110 so that each of the pins 110 and the tooth root 310a can be restricted in the radial direction.

In detail, when the tooth shape of each of the teeth 310 of the tooth gear 300 is basically set to the above-described cycloid tooth shape of FIG. 3, the tooth shape of each of the teeth 310 is larger and higher than the trochoid tooth shape so that a sufficient tooth contact rate may be maintained. In particular, the thickness of a tooth tip 310b may be maintained at least two times of that of the trochoid tooth shape so that rigidity and life span of a tooth may be improved.

Figure 4:
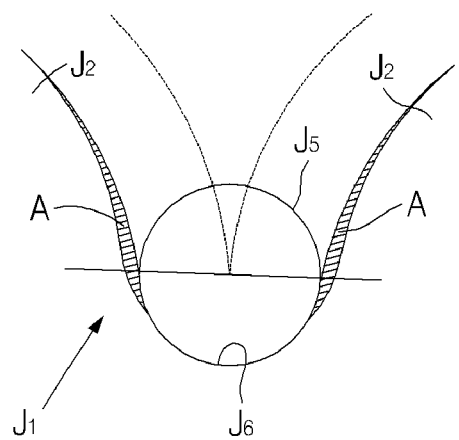
FIG. 4 illustrates an undercut of FIG. 3.
Figure 5:
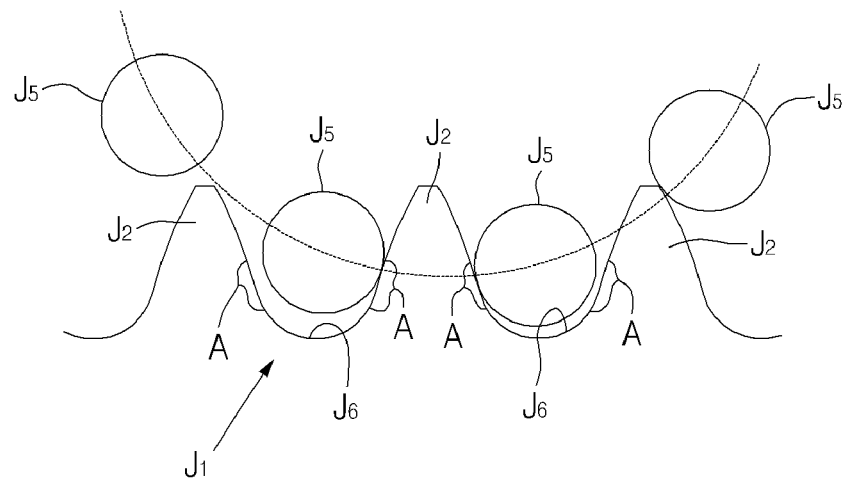
FIG. 5 is a structural view of FIG. 4.
Figure 6:
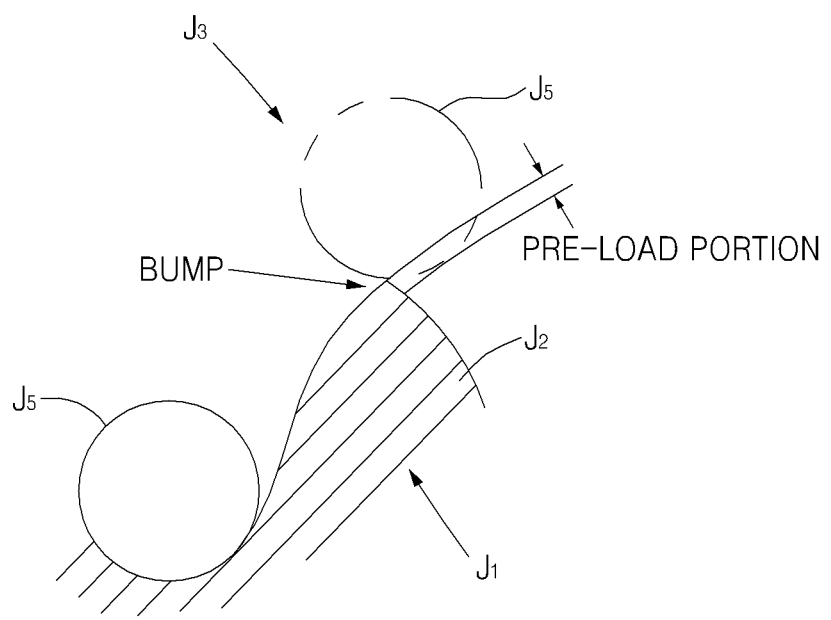
FIG. 6 illustrates a state in which a pre-load is applied in FIG. 3.

Next, the tooth root space portion 320 having a rectangular shape with the edges 320a and 320b that are round-processed is formed in an area of the tooth root 310a of the tooth shape of each of the teeth 310 of the tooth gear 300, the deterioration of the rigidity of a tooth due to the undercut A (see FIG. 4) in a concave shape according to the related art may be reduced.

It is important in the forming of the tooth root space portion 320 that, in a normal (circumferential) direction of a pitch circle having a rectangular shape, a sufficient clearance area with respect to the diameter of each of the pins 110 is secured in order to prevent the forcible insertion phenomenon within a range considering the rigidity and width of a tooth and, in a radial direction, a forcible insertion clearance is maintained as each of the pins 110 and the tooth root 310a are restricted by each other.

In detail, when a pressure angle of the pin gear 100 is 90°, the pins 110 may not transfer power and thus the power may be transferred by only other pins adjacent to the pins 110. When the undercut is an arc (or curve), the undercut increases difficulty in maintaining an assembly distance and makes the application of a pre-load difficult. Thus, in an actual embodiment, the undercut is highly likely to serve as a direct cause to deteriorate precision of a backlash, for example.

Thus, in this embodiment, while the tooth root space portion 320 having a rectangular shape with edges 320a and 320b that are round-processed is provided, an escape space according to a circumferential direction of each of the pins 110 is allowed such that each of the pins 110 and the tooth root 310a can be restricted in the radial direction.

As such, the pins 110 may contact the teeth 310 by applying a pre-load with respect to a radial assembly distance of the pins 110 and the teeth 310. Accordingly, the backlash may be removed, assembly may be made easy, the forcible insertion phenomenon may be prevented, and the undercut may be removed.

The power transmitting apparatus configured as above according to the present embodiment further includes a lubricant supplying unit 200 that is provided on the pin gear 100 to supply a lubricant to the pins 110.

Referring to FIG. 10, in the structure of the pin gear 100, the pin gear 100 includes first and second circular plates 111 and 112 arranged separated from and parallel to each other, with the pins 110 provided therebetween at the same interval in a circumferential direction, first and second circular caps 113 and 114 respectively coupled to exposed surfaces of the first and second circular plates 111 and 112, a plurality of coupling members 115 coupling the first and second circular caps 113 and 114 and the first and second circular plates 111 and 112, and a plurality of pin support bearings 116 coupled to the first and second circular plates 111 and 112 and supporting both end portions of each of the pins 110 to be capable of performing a rolling motion.

In the present embodiment, since twelve pins are provided as the pins 110 at an equiangular interval in the circumferential direction, twelve pin support bearings are accordingly provided as the pin support bearings 116. A plurality of oil seals 117 are further provided between the pin support bearings 116 and the pins 110.

The lubricant supplying unit 200 includes a lubricant storage 210 provided in each of the pins 110 and storing a lubricant, a lubricant ejection hole 220 formed in a lateral surface of each of the pins 110 to communicate with the lubricant storage 210 and ejecting the lubricant in the lubricant storage 210 to the outside of each of the pins 110, and a lubricant supplying portion 230 provided in the second circular cap 114 and supplying the lubricant to the lubricant storage 210 of each of the pins 110.

The lubricant storage 210 refers to an inner space of each of the pins 110 for storing the lubricant. Accordingly, the lubricant storage 210 may be the inner space of each of the pins 110 itself or have a separate pouch shape separately provided in the inner space of each of the pins 110 to store the lubricant.

The lubricant ejection hole 220 is a place to eject the lubricant stored in the inside of each of the pins 110 to the outside of each of the pins 110. As it is illustrated in FIG. 10, in the present embodiment, the lubricant ejection hole 220 is provided at two different positions in a single pin as each of the pins 110. Of course, since this is merely one of various embodiments, the lubricant ejection hole 220 is not necessarily provided at two positions.

However, when the lubricant ejection hole 220 is provided at two positions symmetrically with respect to a lengthwise direction of each of the pins 110, it is a merit that the lubricant is smoothly ejected during a rolling motion of each of the pins 110.

The lubricant supplying portion 230 is formed in a concave form in an inner surface of the second circular cap 114 and has a radial structure in which a cross section thereof is gradually decreased toward the outside in a radial direction. The lubricant supplying portion 230 supplies the lubricant directly to the pins 110 that are rolling elements performing a rolling motion and the pin support bearings 116.

The lubricant is supplied to the pins 110 and the pin support bearings 116 not only by the self-weight or a flow of a liquid, but also by a pressure without any separate power. That is, when the pin gear 100 is rotated by acceleration or deceleration of a driving source such as a motor connected to the pin gear 100, the lubricant flows toward the radially outer side of the lubricant supplying portion 230, that is, the end portion of a radial structure in which the cross section of the lubricant supplying portion 230 gradually decreases, due to a centrifugal force. The flow of the lubricant is accelerated due to the characteristic of a liquid that pressure increases as volume decreases (pv=k). A pressure generated at this time may supply the lubricant to the pins 110 and the pin support bearings 116.

In particular, in the present embodiment, since the pins 110 performing a rolling motion makes a complete circular motion, the lubricant may circulate toward the pin support bearings 116 where lubrication is necessary while a dry operation may be performed in a portion where lubrication is not needed, thereby leading an effective lubrication.

In the present embodiment, the lubricant supplying unit 200 further includes a plurality of balls 240 having a relatively larger size than the lubricant ejection hole 220 and arranged at both end portions of each of the pins 110.

The balls 240 may be manufactured of a steel ball and may reduce a frictional area of each of the pins 110 and a blocking phenomenon of the pin support bearings 116 at both end portions of each of the pins 110 when the balls 240 fall due to the self-weight of each of the pins 110. For reference, in a related art, it has been problematic that a deterioration phenomenon occurs during a long time use or a high speed operation or an amount of a lubricant decreases due to efflorescence of the lubricant. In the present embodiment, since the balls 240 are further provided, heat generation is reduced and efficiency is improved.

In the configuration as above, when a motor (not shown) is connected to the pin gear 100 to perform a rotational motion, the tooth gear 300 engaged with the pin gear 100 performs a linear motion. When the pin gear 100 performs a rotational motion, the lubricant concentrates on the radially outer side of the lubricant supplying portion 230, that is, the end portion of the radial structure in which the cross-section thereof is gradually decreased, due to a centrifugal force. As such, the lubricant may be supplied to the pins 110 and the pin support bearings 116 by a pressure generated as the flow of the lubricant is accelerated.

The lubricant supplied to the lubricant storage 210 in each of the pins 110 is ejected through the lubricant ejection hole 220 during the rolling motion of the pins 110 so as to assist lubrication of a rolling surface of each of the pins 110.

Thus, according to the present embodiment, a pin stuck phenomenon and reduction of a tooth thickness due to the undercut of a tooth root portion may be solved while a cycloid tooth shape having a tooth size higher than a trochoid tooth shape and capable of maintaining a sufficient tooth contact rate is applied to a tooth shape of a tooth gear engagingly coupled to a pin gear capable of relatively moving.

Figure 11:
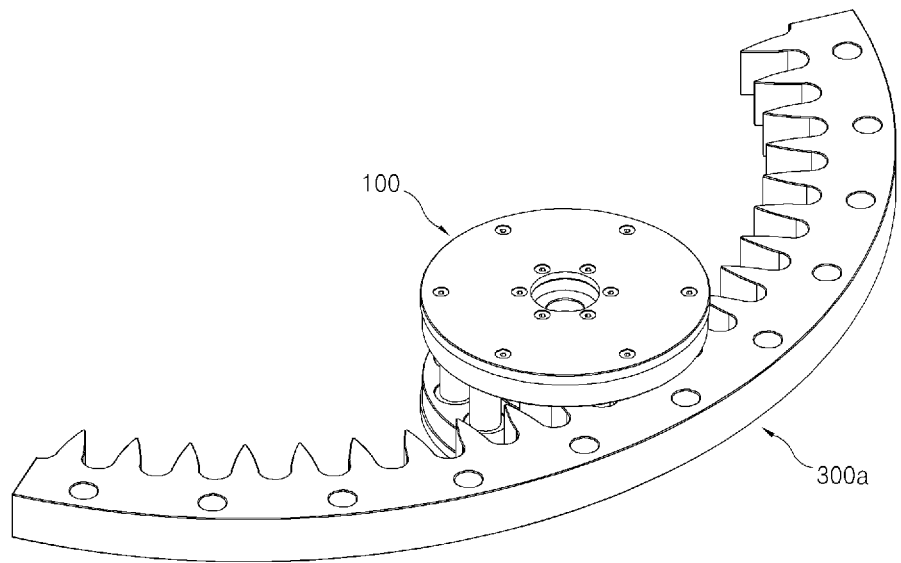
FIG. 11 is a perspective view of a power transmitting apparatus according a second embodiment of the present invention.
Figure 12:
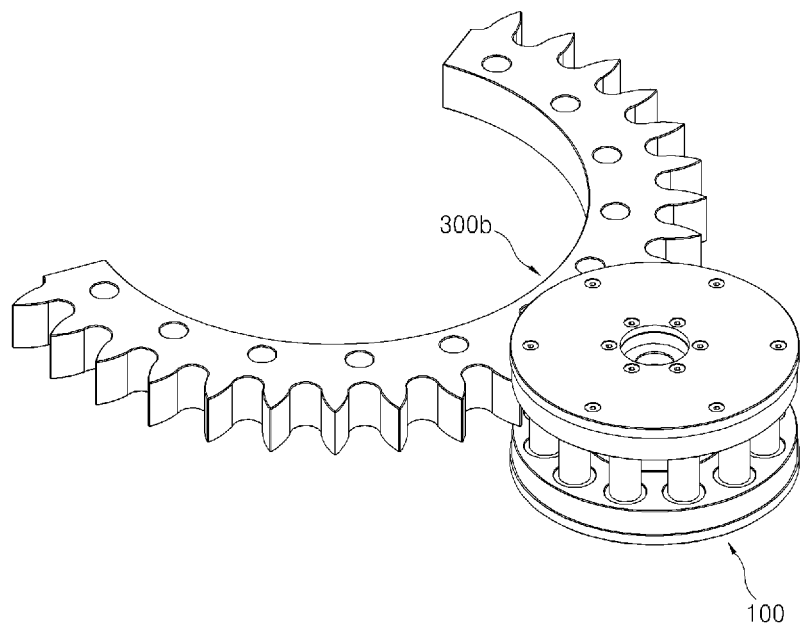
FIG. 12 is a perspective view of a power transmitting apparatus according a third embodiment of the present invention.
Figure 13:
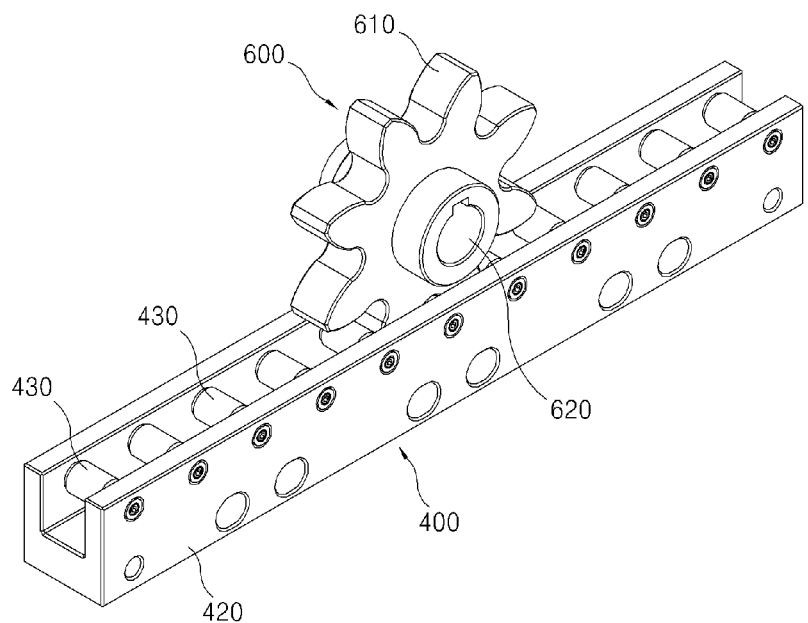
FIG. 13 is a perspective view of a power transmitting apparatus according a fourth embodiment of the present invention.
Figure 14:
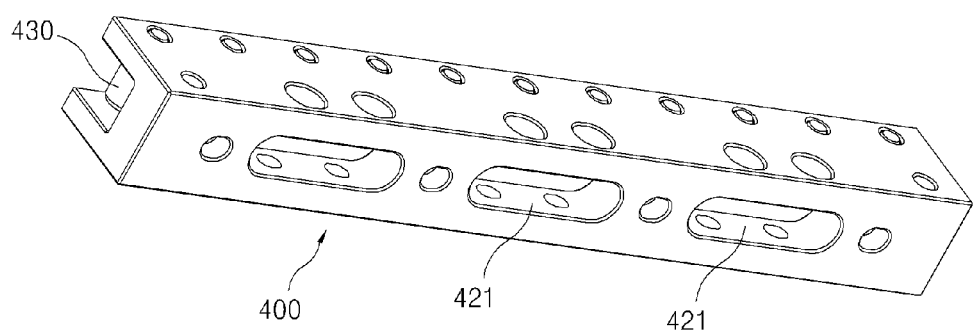
FIG. 14 is a perspective view illustrating a rear surface of the pin gear of FIG. 13.

FIG. 11 is a perspective view of a power transmitting apparatus according a second embodiment of the present invention. FIG. 12 is a perspective view of a power transmitting apparatus according a third embodiment of the present invention.

In the second and third embodiments, like in the first embodiment, the pin gear 100 is a pinion-type driving gear and tooth gears 300a and 300b are rack-type driven gears. However, in the second and third embodiments, the tooth gears 300a and 300b have a curved shape unlike the above-described embodiment.

In FIG. 11, the tooth gear 300a having a curved shape is inscribed on the pin gear 100. In FIG. 12, the tooth gear 300b having a curved shape is circumscribed on the pin gear 100. In these cases, as the pin gear 100 to which a motor (not shown) is connected performs a rotational motion, the tooth gears 300a and 300b engaged with the pin gear 100 performs a linear motion, thereby forming a power transmitting system.

In the structures of FIGS. 13-16, as in the above-description of FIGS. 8 and 9, since the tooth shape of the tooth 310 of each of the tooth gears 300a and 300b is formed in a cycloid tooth shape and the tooth root space portion 320 having a polygonal shape is formed in the area of the tooth root 310a of the tooth shape of the tooth gear 310, a pin stuck phenomenon and reduction of a tooth thickness due to the undercut of the tooth root portion 310a may be solved. The description and illustration thereof will be replaced by those of the first embodiment and the following description will focus only on the lubrication.

In the present embodiment, since a pin gear 400 is a rack-type driven gear, consideration of another aspect different from the above-described first embodiment is needed. Although the same structure as that of the first embodiment may be applied to the present embodiment, since the number of pins 410 is large, if bearings are applied to all of the pins 410, manufacturing costs are increased. Thus, the following structure is applied to the present embodiment.

In the present embodiment, the pin gear 400 includes a gear main body 420 to which the pins 410 are linearly coupled at an equal interval, and a bushing 430 coupled to the outside of each of the pins 410. The gear main body 420 has a rectangular block structure. An elongated through hole 421 is formed in a lower portion of the gear main body 420. The bushing 430 is coupled to the outside of each of the pins 410 and is a portion that is actually and interactively engaged with teeth 610 of a tooth gear 600.

As such, since in the present embodiment the driven gear has a lower rotational speed than the driving gear and the rotation frequency of each bushing 430 is remarkably low, an engaged rotational motion means is replaced by the bushing structure instead of the pin support bearings 116 (see FIG. 10) of the first embodiment. That is, the pins 410 form a support structure and the bushing 430 capable of rotating in a circumferential direction is installed around each of the pins 410.

Yet, if such a structure is in use, starting friction of the pin gear 400 may be increased when the engagement of the pin gear 400 and the tooth gear 600 begins. Accordingly, a lubricant supplying unit 500 is provided to facilitate a smooth rotation of the bushing 430 so that the starting friction may be reduced.

Figure 15:
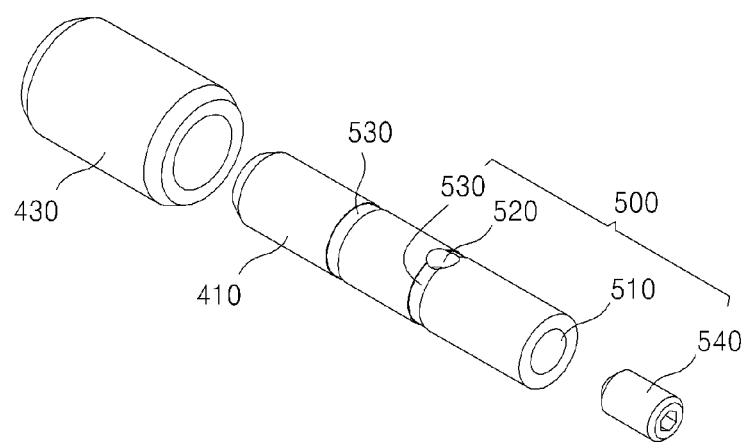
FIG. 15 is an exploded perspective view of a pin area in the pin gear of FIG. 13.
Figure 16:
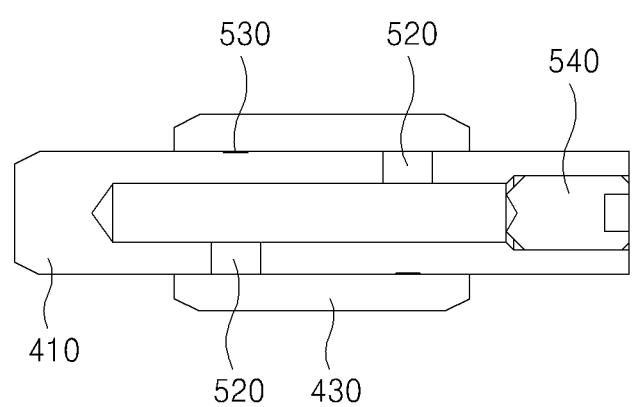
FIG. 16 is a cross-sectional view showing a coupling state of FIG. 15.

The lubricant supplying unit 500, as illustrated in FIGS. 15 and 16, includes a lubricant storage 510 provided in each of the pins 410 and storing a lubricant, a lubricant ejection hole 520 formed in an outer surface of each of the pins 510 to eject the lubricant in the lubricant storage 510 to the outside between each of the pins 410 and the bushing 430, and a cap 540 detachably coupled to an opening portion at one side of the lubricant storage 510.

As described above, the lubricant storage 510 refers to an inner space of each of the pins 410 for storing the lubricant. Accordingly, the lubricant storage 510 may be the inner space of each of the pins 410 or have a separate pouch shape separately provided in the inner space of each of the pins 410 to store the lubricant.

The lubricant ejection hole 520 ejects the lubricant from the lubricant storage 510 to the outside between each of the pins 410 and the bushing 430.

To improve efficiency in ejection of the lubricant, the lubricant supplying unit 500 according to the present embodiment further includes a lubricant groove 530 that is radially and inwardly formed in an area where the lubricant ejection hole 520 is formed along a circumferential direction of each of the pins 410. In the present embodiment, the lubricant groove 530 is formed in the form of two lines. The lubricant ejected through the lubricant ejection hole 520 flows along the lubricant groove 530 and thus supplied between each of the pins 410 and the bushing 430, thereby improving an efficiency of lubrication.

As in the present embodiment, when the lubricant is supplied between each of the pins 410 and the bushing 430 by the lubricant supplying unit 500 after the bushing 430 is coupled to the outside of each of the pins 410, the problem occurring in an existing case of a rack and pinion, that is, as the lubricant is directly exposed to a surface, external dust or foreign materials fall on the surface so as to adhere on the power transmitting apparatus such as a surface of a tooth due to the viscosity of the lubricant, may be solved. According to the present embodiment, the lubricant is not directly exposed to the outside and exists only between each of the pins 410 and the bushing 430 so that the bushing 430 regularly rotates while functioning as a natural dust-proof layer.

In the present embodiment, however, although not pressure-ejected as in the first embodiment, the lubricant may be naturally coated between each of the pins 410 and the bushing 430 during the rolling motion of the pins 410, thereby sufficiently contributing to the lubrication. For reference, the cap 540 coupled to one side of each of the pins 410 is a portion sealed after the lubricant is filled and functions as a pull tab for removing the pins 410 when the pin gear 400 is partially damaged or for maintenance and repair.

In particular, the structure of the present embodiment may be applied to that of the first embodiment. When the present structure is applied to the first embodiment, cost reduction is achieved and dust absorption, stack reduction, and weigh reduction may be possible.

As described above, according to the present invention, a pin stuck phenomenon and reduction of a tooth thickness due to the undercut of a tooth root portion may be solved while a cycloid tooth shape having a tooth size higher than a trochoid tooth shape and capable of maintaining a sufficient tooth contact rate is applied to a tooth shape of a tooth gear engagingly coupled to a pin gear capable of relatively moving.

INDUSTRIAL APPLICABILITY

The present invention may be used for a variety of fields, for example, vehicles, ships, mechanical machining, general machining, etc., where a power transmitting system for converting a rotational motion to a linear motion or a linear motor to a rotational motion is needed.

The invention claimed is:

1. A power transmitting apparatus, comprising:
    a pin gear provided with a plurality of pins configured to perform a rolling motion;
    a tooth gear provided with a plurality of teeth and engagingly coupled to the pin gear so as to be relatively movable; and
    a lubricant supplying unit provided on the pin gear to supply lubricant to the pins, wherein the lubricant supplying unit comprises: a lubricant storage provided inside each of the pins and storing lubricant; and a lubricant ejection hole formed in a lateral surface of each of the pins to communicate with the lubricant storage and ejecting the lubricant from the lubricant storage to outside each of the pins,
    wherein a tooth shape of a tooth of the tooth gear is formed in a cycloid tooth shape and a tooth root space portion is formed in a tooth root portion of the tooth shape,
    wherein the tooth root space portion has a rectangular shape with edges that are round-processed.

2. The power transmitting apparatus of claim 1, wherein, in the tooth root space portion, an escape space according to a circumferential direction of each of the pins is allowed and each of the pins and the tooth root are restricted by each other in a radial direction.

3. The power transmitting apparatus of claim 1, wherein the pin gear is a pinion-type driving gear and the tooth gear is a rack-type driven gear.

4. The power transmitting apparatus of claim 3, wherein the pin gear comprises:
    first and second circular plates arranged separated from and parallel to each other, with the pins provided therebetween at the same interval in a circumferential direction;
    first and second circular caps respectively coupled to exposed surfaces of the first and second circular plates; and
    a plurality of coupling members coupling the first and second circular caps and the first and second circular plates.

5. The power transmitting apparatus of claim 4, wherein the pin gear further comprises a plurality of pin support bearings coupled to the first and second circular plates and supporting both end portions of each of the pins so as to perform a rolling motion.

6. The power transmitting apparatus of claim 4, wherein the lubricant supplying unit further comprises:
    a lubricant supplying portion provided in any one of the first and second circular caps and supplying the lubricant to the lubricant storage of the pin.

7. The power transmitting apparatus of claim 6, wherein the lubricant supplying portion is formed in a concave form in an inner surface of the any one circular cap and has a radial structure in which a cross section thereof is gradually decreased toward the outside in a radial direction.

8. The power transmitting apparatus of claim 6, wherein the lubricant ejection hole is provided at two positions symmetrically in one of the pin in a lengthwise direction.

9. The power transmitting apparatus of claim 6, wherein the lubricant supplying unit further comprises a plurality of balls having a size relatively larger than the lubricant ejection hole and arranged at both end portions of the pin to reduce a frictional area of the pin.

10. The power transmitting apparatus of claim 3, wherein the tooth gear has a curved shape and the pin gear is partially inscribed or circumscribed on the tooth gear.

11. The power transmitting apparatus of claim 1, wherein the pin gear is a rack-type driven gear and the tooth gear is a pinion-type driving gear.

12. The power transmitting apparatus of claim 11, wherein the pin gear comprises:
   a gear main body to which the plurality of pins are linearly coupled at an equal interval; and
   a bushing coupled to the outside of each of the plurality of pins.

13. The power transmitting apparatus of claim 12, wherein the lubricant supplying unit further comprises a lubricant groove radially and inwardly formed in an area where the lubricant ejection hole is formed along a circumferential direction of each of the pins.

14. The power transmitting apparatus of claim 12, wherein the lubricant supplying unit further comprises a cap detachably coupled to an opening portion at one side of the lubricant storage.

* * * * *